April 1, 1930.　　　M. H. P. SOLOGAISTOA　　　1,752,816
ENGINE PISTON
Filed May 2, 1929　　　2 Sheets-Sheet 1
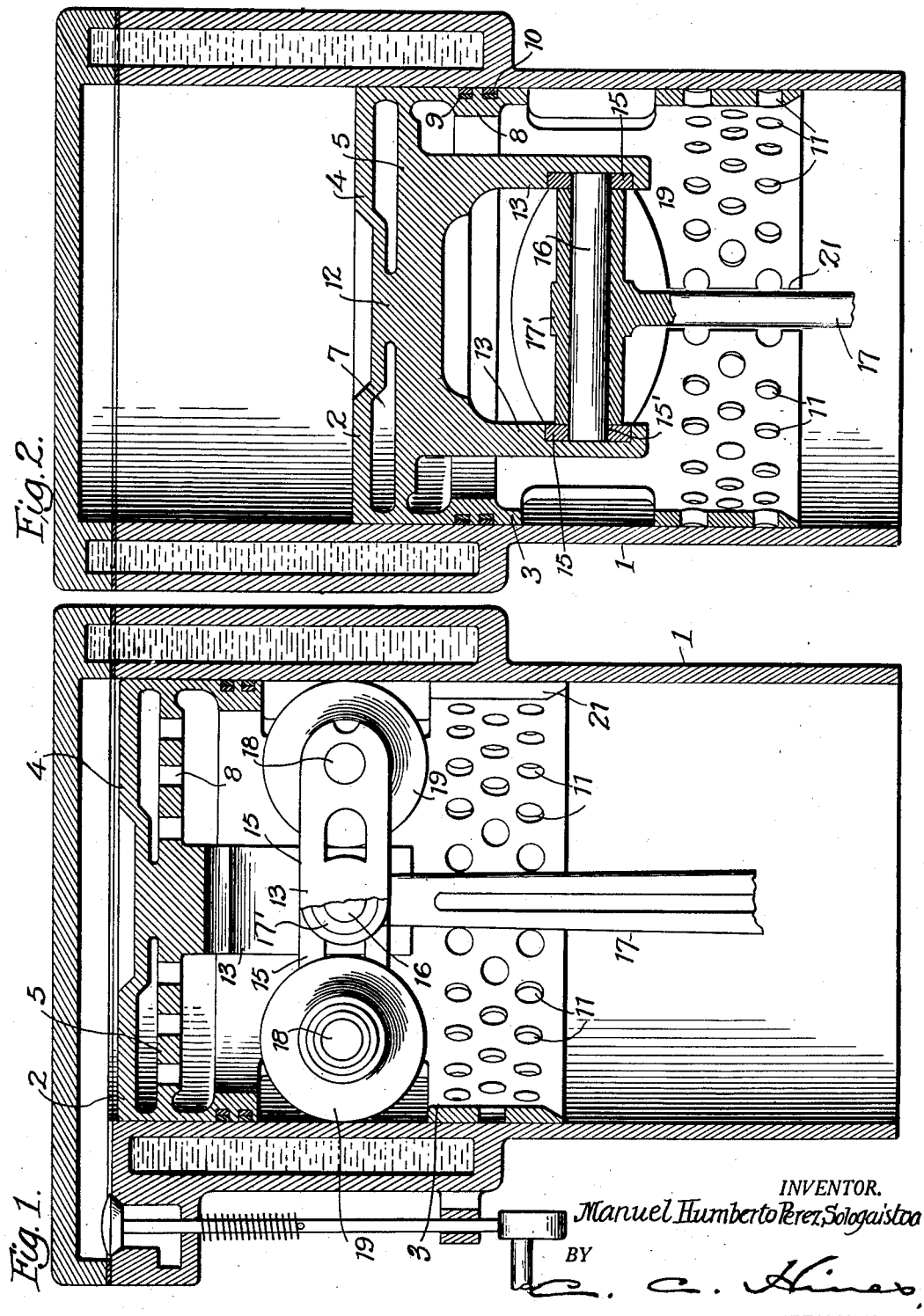

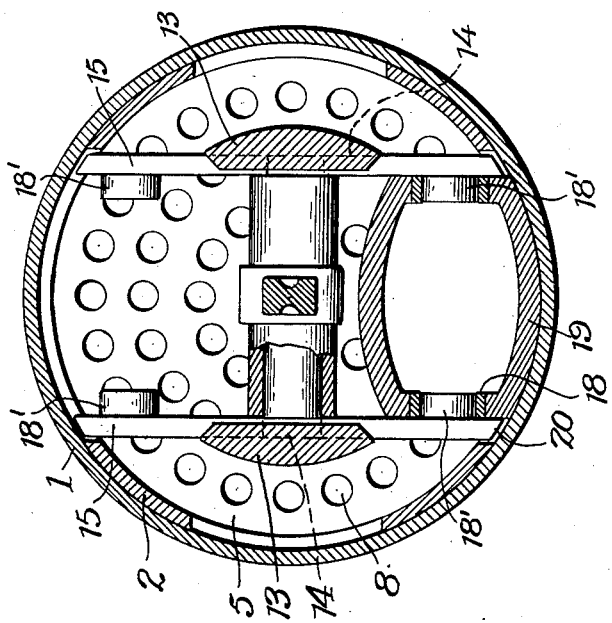
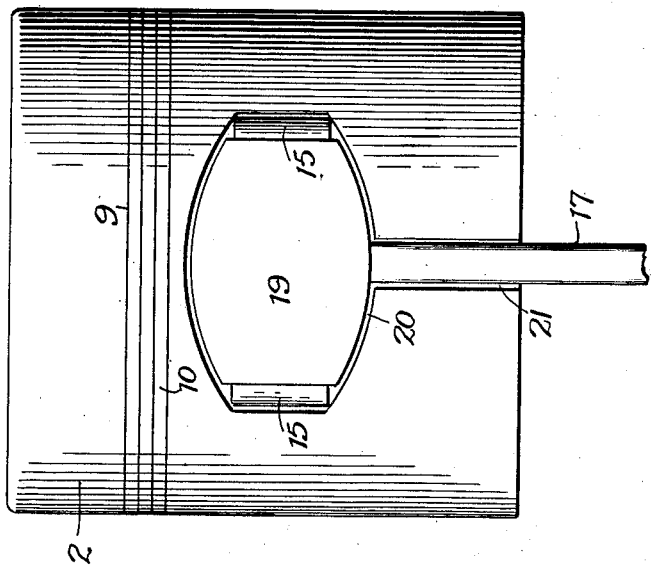

Patented Apr. 1, 1930

1,752,816

UNITED STATES PATENT OFFICE

MANUEL HUMBERTO PÉREZ SOLOGAISTOA, OF SAN PEDRO SULA, HONDURAS

ENGINE PISTON

Application filed May 2, 1929. Serial No. 359,852.

This invention relates to pistons for air, internal combustion, steam and other like engines employing reciprocatory pistons coupled by connecting rods to a crank shaft.

In engines of this character objectionable wear and tear upon the cylinders and pistons is caused by lateral motion of the pistons, or so-called "piston slap", as a result of the angularity of motion of the connecting rod, and in addition objectionable friction is produced which, with leakage due to irregular wear, causes waste of fuel and lubricant.

The main object of the present invention is to provide a piston construction which embodies means compensating for the angularity of motion of the connecting rod, whereby the piston is permitted to run in a true path, preventing piston slap and the other objections above-noted.

A further object of the invention is to provide a construction which reduces friction and wear and tear upon the cylinder and piston, and which admits of the ready connection and disconnection of the piston and the piston rod without the use of ordinary fastenings.

A still further object of the invention is to provide means to permit of the free circulation of air through the piston so as to secure a better cooling of the piston in service.

The invention consists of the features of construction, combination and arrangement of parts, hereinafter fully described and claimed, reference being had to the accompanying drawings, in which:—

Fig. 1 is a vertical section through a cylinder and piston embodying the invention.

Fig. 2 is a similar view taken at right angles to the plane of section shown in Fig. 1.

Fig. 3 is a horizontal transverse section through the cylinder and piston.

Fig. 4 is a view in side elevation of the piston.

Referring now more particularly to the drawings, 1 designates an engine cylinder within which reciprocates a piston 2, said piston comprising a hollow piston body 3 open at its lower or inner end and closed at its upper or outer end by a head 4, below which the piston is provided with an auxiliary inner head 5 and an annular thickened or enlarged portion 6. The auxiliary head 5 is spaced from the head 4 to provide an intervening cooling space or chamber 7, and the said auxiliary head is formed with openings 8 for the passage of cooling currents of air toward and from said chamber, by means of which a circulation of air through the interior of the piston is permitted for a better piston cooling action. The annular portion 6 gives an increased wall thickness to provide for the formation of grooves 9 containing the usual packing rings 10 to prevent oil and fuel leakage. The skirt portion of the piston body may be provided, if desired, with openings 11 to effect a better cooling of this portion of the piston and the surfaces of the cylinder with which it travels in contact, as well as the better lubrication of these surfaces.

The auxiliary head 5 is centrally connected with the central portion of the head 4 by a reinforcing portion 12, and connected with the head 5 is a pair of depending or inwardly projecting bracket arms 13, arranged in opposing relation on opposite sides of the center of the piston and provided in their opposed faces with retaining and guide grooves 14. Slidably fitted in the grooves 14 are bars 15 having openings 15' receiving a pin 16 removably fitted therein and which passes through an eye 17' on the end of the connecting rod 17, thus pivotally and detachably connecting the connecting rod to said bars.

The bars 15 are provided at their ends, which project to equal degrees on opposite sides of the pivot connection, with bearings 18' to receive bushings 18 on which are mounted anti-friction rollers 19. These rollers 19 have portions of their peripheries arranged to project outwardly through openings 20 in diametrically opposite sides of the piston body so that said rollers engage diametrically opposite sides of the cylinder and provide with the frame bars 15 an anti-friction roller carriage to which the connecting rod is pivoted and which forms an anti-friction guide for the piston in the reciprocating movements of the latter.

It will be understood that in the operation of the piston the bars 15 are free to slide laterally of the piston in the grooves 14 and, conversely, the piston is permitted to slide laterally on the bars 15, as a result of which a relative motion between the wheeled anti-friction carriage to which the connecting rod is coupled and the piston is allowed, which adapts the piston to move in an absolutely true and straight path at all times concentric with the cylinder, while the anti-friction carriage forms the coupling connection between the piston and the connecting rod, all of the parts of which coupling connection are arranged in a more or less common general transverse plane so that, any relative angularity of motion between the carriage or coupling member and the connecting rod will be comparatively small and will not be transmitted to the piston, so that lateral pivotal motion of the piston on the pivot pin and resulting piston slap, with its stated objections, will be entirely prevented. By this means, also, wear and tear upon the piston and cylinder will be reduced, so that their useful life periods will be prolonged and, as the surfaces of the cylinder and piston will be maintained in a substantially true shape, losses of oil and motive fuel due to leakage will be prevented. Also, as the construction described materially reduces friction between the cylinder and piston, the engine may be operated with materially less fuel, effecting a great saving of fuel over piston constructions of ordinary character. The construction described further ensures a better cooling of the piston, as will be readily understood.

In order to permit ready assemblage and disassemblage of the parts, the piston is provided with a longitudinal slot 21 extending through its base or open end and intersecting one of the openings 20. When the piston is withdrawn with the connecting rod from the cylinder the rod and carriage as a unit may be engaged with or disengaged from the piston by a relative transverse sliding movement between the piston and the carriage in which the carriage and connecting rod pass through one of the openings 20 and the slot 21. The pivot connection and journals of the anti-friction rollers may be so mounted that they are readily connectible and disconnectible from the carriage frame bars, so that quick assemblage and disassemblage of these parts is permitted.

Having thus fully described my invention, I claim:—

1. In an engine, a cylinder, a reciprocatory piston, a connecting rod, and an anti-friction coupling connection between the rod and piston and to which the rod is pivoted, said connection having bearing contact with the walls of the cylinder and sliding engagement with the piston to permit the coupling connection and piston to have relative independent lateral movement.

2. In an engine, a cylinder, a reciprocatory piston, a connecting rod, and a carriage pivotally coupled to the rod and provided with anti-friction rollers in running engagement with the cylinder walls, said carriage having lateral sliding engagement with the piston.

3. In an engine, a cylinder, a reciprocatory piston, a connecting rod, bracket arms in the piston, a carriage to which the rod is pivotally coupled having transverse sliding engagement with said bracket arms, and anti-friction rollers carried by said carriage and in running connection with the walls of the cylinder.

4. In an engine, a cylinder, a piston mounted to reciprocate therein and having a pair of diametrically opposite openings in its side walls, a pair of spaced bracket arms in said piston, a connecting rod, a carriage having transverse sliding engagement with the bracket arms and to which the rod is pivoted, and anti-friction rollers on the carriage projecting through the openings in the piston and engaging the walls of the cylinder.

5. In an engine, a cylinder, a reciprocatory piston therein having a pair of diametrically disposed openings in its side walls and a slot communicating with one of said openings, bracket arms in said piston, a carriage transversely slidable in said bracket arms, a connecting rod pivoted to said carriage, and anti-friction rollers on the carriage projecting through the openings in the piston and engaging the walls of the cylinder, the rod and carriage being engageable with and disengageable from the piston through one of the openings and the slot in the piston.

In testimony whereof I affix my signature.

MANUEL HUMBERTO PÉREZ SOLOGAISTOA.